(12) United States Patent
Chaiyawantakee et al.

(10) Patent No.: US 9,916,616 B2
(45) Date of Patent: Mar. 13, 2018

(54) INVENTORY MANAGEMENT SYSTEM USING INCREMENTAL CAPACITY FORMATS

(71) Applicant: Western Digital Technologies, Inc., Irvine, CA (US)

(72) Inventors: Suwanchai Chaiyawantakee, Pathumthani (TH); Pajaree Srimongkol, Ratchaburi (TH); Permsin Bunsiri, Nonthaburi (TH); Kiattiphong Lanak, Nonthaburi (TH); Patrick B. Wilkison, Newport Beach, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 696 days.

(21) Appl. No.: 14/338,498

(22) Filed: Jul. 23, 2014

(65) Prior Publication Data

US 2015/0278925 A1 Oct. 1, 2015

Related U.S. Application Data

(60) Provisional application No. 61/973,160, filed on Mar. 31, 2014.

(51) Int. Cl.
*G06Q 30/00* (2012.01)
*G06Q 30/06* (2012.01)

(52) U.S. Cl.
CPC ................. *G06Q 30/0635* (2013.01)

(58) Field of Classification Search
CPC ........... G06Q 30/0605; G06Q 30/0621; G06Q 30/0639
See application file for complete search history.

(56) References Cited

U.S. PATENT DOCUMENTS 5,287,500 A 2/1994 Stoppani, Jr.
5,343,670 A * 9/1994 Gombos ............... A01F 15/005
53/399

(Continued)

FOREIGN PATENT DOCUMENTS

WO WO 2010/123513 A1 * 10/2010 ............. G06Q 10/00

OTHER PUBLICATIONS

Youn-Kyoung Joung and Sang Do Noh; "Intelligent 3D packing using a grouping algorithm for automotive container engineering"; Mar. 19, 2014; Journal of Computational Design and Engineering, vol. 1, No. 2 (2014) 140-151; www.jcde.org.*

*Primary Examiner* — Naeem U Haq
*Assistant Examiner* — Norman Donald Sutch, Jr.
(74) *Attorney, Agent, or Firm* — Chang & Hale LLP

(57) ABSTRACT

An inventory management method for storage devices may comprise obtaining an order for an aggregate storage capacity from a customer; and determining a usable capacity of each of a plurality of storage devices. From the plurality of storage devices, a first set of storage devices may be selected, at least some of which have different usable storage capacities from one another, such that the first set of storage devices comprises a first predetermined number of storage devices and has a first aggregate storage capacity that is at least equal to an integer fraction of the aggregate capacity ordered by the customer. The first set of storage devices may then be packed into a first container configured to accommodate the first predetermined number of storage devices. A second set of storage devices may be similarly be selected from remaining ones of the plurality of storage devices and packaged.

19 Claims, 6 Drawing Sheets

(56) References Cited

U.S. PATENT DOCUMENTS

| | | |
|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,446,156 B1 | 9/2002 | Chia et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,633,442 B2 | 10/2003 | Quak et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,795,261 B2 | 9/2004 | Chia et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |

(56) References Cited

U.S. PATENT DOCUMENTS

| | | |
|---|---|---|
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. |
| 7,009,820 B1 | 3/2006 | Hogg |
| 7,012,771 B1 | 3/2006 | Asgari et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,324,860 B2 | 1/2008 | Dyer |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,430,513 B2 | 9/2008 | Kirkland et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,974,029 B2 | 7/2011 | Tsai |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |

(56) References Cited

U.S. PATENT DOCUMENTS

| | | |
|---|---|---|
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,682,751 B1 * | 3/2014 | Antony ............... G06Q 10/08 705/28 |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 9,082,148 B1 * | 7/2015 | Oczkowski ......... G06Q 30/0641 |
| 2005/0278484 A1 * | 12/2005 | Mukker ............... G06F 3/0608 711/114 |
| 2007/0163841 A1 * | 7/2007 | Hatcher ............... G09B 19/00 186/66 |
| 2009/0113702 A1 | 5/2009 | Hogg |
| 2010/0306551 A1 | 12/2010 | Meyer et al. |

(56) References Cited

U.S. PATENT DOCUMENTS

| | | |
|---|---|---|
| 2011/0226729 A1 | 9/2011 | Hogg |
| 2012/0158627 A1* | 6/2012 | Arunapuram ........ G06Q 10/043 706/13 |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

* cited by examiner

| | 1 | 2 | 3 | 4 | 5 | 6 | 7 | 8 | 9 | 10 | 11 | 12 | 13 | 14 | 15 | 16 | 17 | 18 | 19 | 20 | SUM | AV. CAP. |
|---|---|---|---|---|---|---|---|---|---|---|---|---|---|---|---|---|---|---|---|---|---|---|
| S1 | 4.6 | 4.6 | 4.6 | 4.6 | 4.6 | 4.6 | 4.6 | 4.6 | 4.6 | 4.6 | 4.6 | 4.6 | 4.6 | 4.6 | 3.6 | 3.6 | 3.6 | 3.6 | 3.6 | 3.6 | 86 | 4.3 |
| S2 | 4.6 | 4.6 | 4.6 | 4.6 | 4.6 | 4.6 | 4.6 | 4.6 | 4.6 | 4.6 | 4.6 | 4.6 | 4.6 | 4.4 | 3.8 | 3.6 | 3.6 | 3.6 | 3.6 | 3.6 | 86 | 4.3 |
| S3 | 4.6 | 4.6 | 4.6 | 4.6 | 4.6 | 4.6 | 4.6 | 4.6 | 4.6 | 4.6 | 4.6 | 4.6 | 4.4 | 4.4 | 3.8 | 3.8 | 3.6 | 3.6 | 3.6 | 3.6 | 86 | 4.3 |
| S4 | 4.6 | 4.6 | 4.6 | 4.6 | 4.6 | 4.6 | 4.6 | 4.6 | 4.6 | 4.6 | 4.6 | 4.4 | 4.4 | 4.4 | 3.8 | 3.8 | 3.8 | 3.6 | 3.6 | 3.6 | 86 | 4.3 |
| S5 | 4.6 | 4.6 | 4.6 | 4.6 | 4.6 | 4.6 | 4.6 | 4.6 | 4.6 | 4.6 | 4.4 | 4.4 | 4.4 | 4.4 | 3.8 | 3.8 | 3.8 | 3.8 | 3.6 | 3.6 | 86 | 4.3 |
| S6 | 4.6 | 4.6 | 4.6 | 4.6 | 4.6 | 4.6 | 4.6 | 4.6 | 4.6 | 4.4 | 4.4 | 4.4 | 4.4 | 4.4 | 3.8 | 3.8 | 3.8 | 3.8 | 3.8 | 3.6 | 86 | 4.3 |
| S7 | 4.6 | 4.6 | 4.6 | 4.6 | 4.6 | 4.6 | 4.6 | 4.6 | 4.4 | 4.4 | 4.4 | 4.4 | 4.4 | 4.4 | 3.8 | 3.8 | 3.8 | 3.8 | 3.8 | 3.8 | 86 | 4.3 |
| S8 | 4.6 | 4.6 | 4.6 | 4.6 | 4.6 | 4.6 | 4.6 | 4.4 | 4.4 | 4.4 | 4.4 | 4.4 | 4.4 | 4.4 | 4.2 | 4.2 | 3.8 | 3.8 | 3.8 | 3.8 | 86 | 4.3 |
| S9 | 4.6 | 4.6 | 4.6 | 4.6 | 4.6 | 4.6 | 4.4 | 4.4 | 4.4 | 4.4 | 4.4 | 4.4 | 4.4 | 4.4 | 4.2 | 4.2 | 4.0 | 3.8 | 3.8 | 3.8 | 86 | 4.3 |
| S10 | 4.6 | 4.6 | 4.6 | 4.6 | 4.6 | 4.4 | 4.4 | 4.4 | 4.4 | 4.4 | 4.4 | 4.4 | 4.2 | 4.2 | 4.2 | 4.0 | 4.0 | 4.0 | 3.8 | 3.8 | 86 | 4.3 |
| S11 | 4.6 | 4.6 | 4.6 | 4.6 | 4.4 | 4.4 | 4.4 | 4.4 | 4.4 | 4.4 | 4.4 | 4.2 | 4.2 | 4.2 | 4.2 | 4.0 | 4.0 | 4.0 | 4.0 | 4.0 | 86 | 4.3 |
| S12 | 4.6 | 4.6 | 4.6 | 4.4 | 4.4 | 4.4 | 4.4 | 4.4 | 4.4 | 4.4 | 4.4 | 4.2 | 4.2 | 4.2 | 4.2 | 4.2 | 4.0 | 4.0 | 4.0 | 4.0 | 86 | 4.3 |
| S13 | 4.6 | 4.6 | 4.4 | 4.4 | 4.4 | 4.4 | 4.4 | 4.4 | 4.4 | 4.4 | 4.4 | 4.4 | 4.4 | 4.4 | 4.0 | 4.0 | 4.0 | 4.0 | 4.0 | 4.0 | 86 | 4.3 |

*FIG. 5*

INVENTORY MANAGEMENT SYSTEM USING INCREMENTAL CAPACITY FORMATS

BACKGROUND

Embodiments are related to storage devices such as data storage devices having rotating and/or solid state recording media.

BRIEF DESCRIPTION OF THE DRAWINGS

FIG. 5 is a table showing representative capacity selection possibilities for meeting an exemplary customer-ordered aggregate capacity using storage devices of varying capacities, according to one embodiment.

DETAILED DESCRIPTION

Data storage devices such as hard disk drives (HDDs), solid state drives (SSDs) and hybrids thereof may be sold at particular capacity points. For example, storage devices may be sold in capacities 3 TB storage devices, 3.5 TB storage devices or 4 or 5 TB storage devices, to name but a few representative (as of this writing) standard storage capacities. Such storage devices may then be sold to resellers, who storage devices having known, predetermined standard data storage capacities. Such storage devices may be incorporated, for example, in storage arrays that are re-sold to further downstream customers or integrators.

However, due to manufacturing variations, some storage devices are capable of storing an amount of data that is incrementally larger or smaller than the standard capacity for which it is manufactured. For example, a storage device manufactured with a 4 TB target capacity may, due to bad sectors or bad blocks, be only capable of storing 3.8 TB after formatting. Similarly, another storage device manufactured with the same 4 TB target capacity may comprise many fewer bad sectors or bad blocks, and be capable of storing fully 4.4 TB after formatting. The storage capacities of manufactured and formatted storage devices may not be fixed but may, for example, be spread over a continuum or distribution of storage capacities, within predetermined boundaries.

Figure 1:
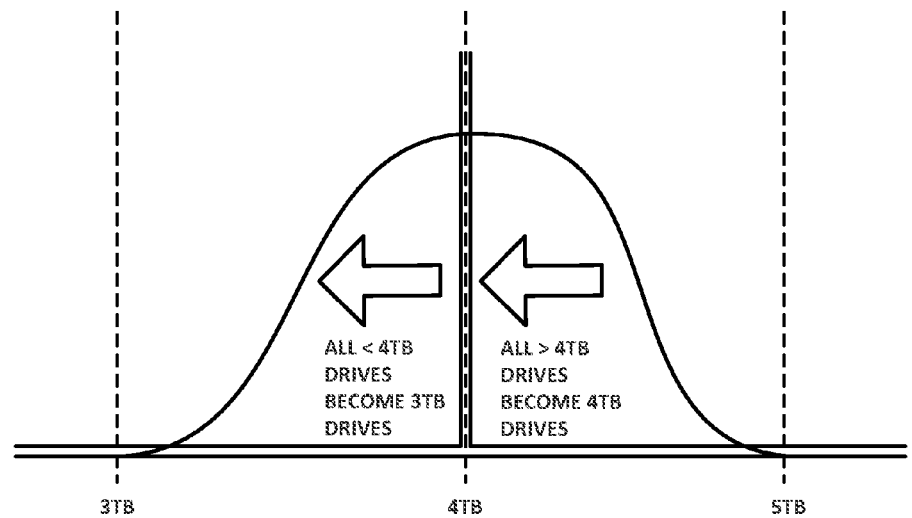
FIG. 1 shows a distribution of capacities of data storage devices and a capacity utilization method.
Figure 2:
FIG. 2 shows distributions, over three consecutive quarters, of representative data storage capacities, evidencing incremental capacity increases over time.
Figure 2:
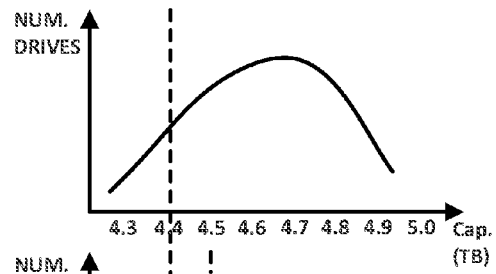
Figure 2:
Figure 2:
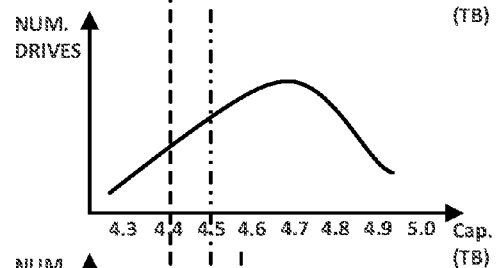
Figure 2:
Figure 2:
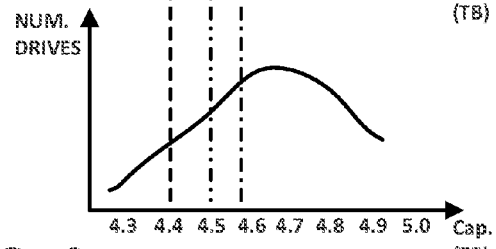

FIG. 1 shows just such a distribution of storage device capacities and a suboptimal capacity utilization method. As shown therein, storage devices manufactured for a nominal 4 TB may, in fact, enable storage of a range of capacities ranging from just over 3 TB for example to just under 5 TB for example. In between, the distribution of capacities may resemble a normal distribution, or may be skewed towards one or the other of the extremes depending upon the manufacturing process, prevailing conditions during a particular production run or any number of other factors that could influence the capacity yield of the storage devices. Nevertheless, one existing capacity utilization method is to "waterfall" the storage devices to the next-lowest standard capacity. As suggested in FIG. 1, storage devices whose usable capacity falls below the standard 4 TB (e.g., 3.8 TB) are formatted to the next-lowest standard capacity of 3 TB. Conversely, those storage devices whose usable capacities are determined to be above 4 TB (e.g., 4.4 TB) are formatted to have a total usable capacity of 4 TB.

Although such a method produces drives having a known, standardized capacity that are required by the supply chain of some customers, a substantial amount of storage capacity remains unused. For example, the 3.8 TB storage device that was formatted to 3 TB comprises 800 MB of otherwise usable storage capacity that is disabled or rendered inaccessible by the formatting process. Likewise, the 4.4 TB storage device that was formatted to 4 TB comprises 400 MB of otherwise usable storage capacity that is also rendered inaccessible by formatting the storage device to the standard 4 TB size. These intentionally downgraded storage devices (e.g., 4.4 TB to 4 TB) can only be sold at the 4 TB price point. The 400 MB in unused (and intentionally rendered inaccessible) capacity is capacity that the manufacturer cannot sell.

The rise of large-scale web services such as, for example, online social networks, has been accompanied by a corresponding increase in storage requirements. Moreover, such web service providers are themselves the end-users of the storage devices and their servers are fully able to make full use of data storage devices that deviate, at least to some extent, from the aforementioned standard sizes. Some such web-service providers have taken to ordering data storage capacity, rather than a predetermined number of drives of a known, predetermined standard capacity. Moreover, as much of the cost of installing, running and maintaining a storage server is fixed (in terms of wattage and space, for example), any incremental usable storage space that is made available comes at a very low incremental cost. Therefore, such web-services providers (among others) are very willing to pay incrementally more for a storage device having incrementally more storage capacity, as such incremental additional capacity, in the aggregate, replaces additional storage devices and racks of storage devices that would otherwise be needed to supply that incremental capacity at a much greater cost.

Not only do storage device yields vary incrementally (e.g., from 3.5 TB to 4.6 TB, for example) at any point in time, but the average capacity of drives may increase over time, due to improved processes and quality controls. That is, drives manufactured with a nominal target capacity of, for example, 4 TB, may store an average of 4.4 TB during Q1 of a given year, may store an average of 4.5 TB the following quarter and may average 4.6 TB in Q3 of that same year. This is the situation depicted in the exemplary scenario in FIG. 3. As shown therein, the average capacity of storage devices manufactured during production Quarter 1 (PQ1) on a 4 TB drive line was 4.4 TB which, for 250,000 storage devices, equals about 1.110 EB (Exabytes). As the customers to which these storage devices are sold are, in fact, willing to pay for the extra 400 MB, on average, on each storage device, the storage device manufacturer realizes additional revenue corresponding to that extra incremental capacity (shown in PQ1 as "$"). Similarly, the average capacity of storage devices manufactured during PQ2 on the same or similar 4 TB drive line increased to 4.6 TB which, for 250,000 storage devices, equals about 1.123 EB. As the customers to which these storage devices are sold are willing to pay for the extra 600 MB, on average, on each storage device, the storage device manufacturer realizes greater additional revenue corresponding to that extra incremental capacity (shown in PQ2 as "$$"). Lastly, the average capacity of storage devices manufactured during PQ3 on the same or similar 4 TB drive line was 4.6 TB which, for 250,000 storage devices, equals about 1.145 EB. This enables the manufacturer to realize additional revenue corresponding to that 600 MB extra incremental capacity (shown in PQ1 as "$$$").

A customer may, for example, order storage devices of a certain form factor and interface totaling 860 TB of data storage. Storage devices are often sold in standard-sized containers configured to contain a predetermined number of storage devices. For purposes of illustration only, it is assumed that the containers in which the storage devices are packaged are configured to contain 20 storage devices. Therefore, an 860 TB order would work out to 10 containers of 20 drives each, with each container storing 86 TB. Therefore, the customer expects to receive 200 drives and may have provisioned a sufficient number of racks, power and data cabling, power generation and HVAC to deploy the 200 storage devices that will provide the 860 TB of capacity ordered.

However, within those constraints, according to one embodiment, the storage device manufacturer (or other party) has been given the latitude to provide storage devices from across the storage capacity continuum, provided that each container comprises at least an aggregate storage capacity that is at least equal to an integer fraction of the aggregate capacity ordered by the customer. In the example being developed herewith, the aggregate capacity ordered by the customer is 860 TB, which is to be shipped in containers (e.g., boxes) configured to contain 20 storage devices each.

Suppose, for example, that manufacturing has produced storage devices for shipment to the customer ranging from the 3.6 TB capacity point to the 4.6 TB capacity point, in increments of 200 MB. Rather than waterfall the 4.2 TB, 4.4 TB and 4.6 TB storage devices to the standard capacity of 4 TB and the 3.6 TB and 3.8 TB storage devices to the standard capacity of 3 TB, one embodiment envisages packing storage device having a variety of capacity points in one or more of the containers to collectively contain the customer's ordered 860 TB of capacity.

Figure 3:
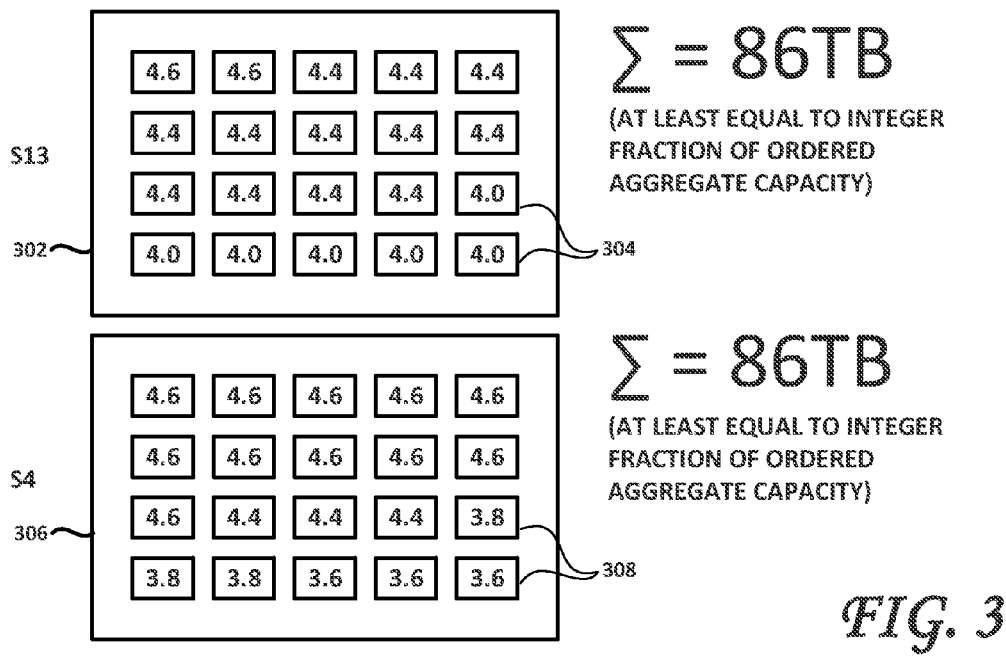
FIG. 3 shows two representative containers comprising storage devices, each of the two containers having a different distribution of capacities, according to one embodiment.

FIG. 3 shows two representative containers comprising storage devices having a different distribution of capacities, according to one embodiment of an inventory management method. Indeed, according to one embodiment, to fill this customer order, a plurality of manufactured storage devices may be formatted, and the usable capacity of each of the formatted storage devices may be determined. From these formatted storage devices, a first set of storage devices may be selected. One or more of these selected storage device may have different usable storage capacities from one another such as, for example, a mix of two or more of the 3.6 TB to 4.4 TB drives in this example. This first set of storage devices may comprise a predetermined number (such as 20, for example) of storage devices. To meet the ordered aggregate capacity, this first set of storage devices, destined to be packed into one of the 20-storage device containers in this example, may have a first aggregate storage capacity that is equal to or greater than an integer fraction (e.g., an integer fraction of 10) of the 860 TB aggregate capacity ordered by the customer. In this example, the first aggregate capacity of the first set of storage devices should be at least equal to $\frac{1}{10}^{th}$ of the aggregate capacity ordered by the customer, as the ordered capacity is to be shipped in 10 containers of 20 storage devices. Therefore, this first set of storage device should have an aggregate capacity at least equal to 86 TB and may be packaged a first container configured to accommodate the first predetermined number (20 in this example) of storage devices. In FIG. 3, container 302 is configured to contain the 20 storage devices 304 of the first set of storage devices. It is to be noted that container 302 comprises, in this example, two 4.6 TB storage devices, eleven 4.4 TB storage devices and six 4.0 storage devices. Together, the aggregate capacity of container 302 is 86 TB.

Similarly, from these formatted storage devices, a second set of storage devices may be selected. As in the selected first set of storage devices, one or more of these may have different usable storage capacities from one another such as, for example, a mix of two or more of the 3.6 TB to 4.4 TB drives in this example. This second set of storage devices may comprise the same predetermined number (such as 20, for example) of storage devices. To meet the ordered aggregate capacity, this second set of storage devices, destined to be packed into another one of the 20-storage device containers in this example, may have a first aggregate storage capacity that is equal to or greater than an integer fraction (e.g., an integer fraction of 10) of the 860 TB aggregate capacity ordered by the customer. In this example, the second aggregate capacity of the first set of storage devices should be at least equal to $\frac{1}{10}^{th}$ of the aggregate capacity ordered by the customer, as the ordered capacity is to be shipped in ten containers of 20 storage devices. Therefore, this second set of storage devices should have an aggregate capacity at least equal to 86 TB and may be packaged a second container configured to accommodate the second predetermined number (20 in this example) of storage devices. In FIG. 3, container 306 is configured to contain the 20 storage devices 308 of the second set of storage devices. It is to be noted that container 306 comprises, in this example, eleven 4.6 TB storage devices, three 4.4 TB storage devices, three 3.8 TB storage devices and three 3.6 TB storage devices. Together, the aggregate capacity of container 306 is also 86 TB.

Therefore, the makeup of each container need not be uniform, at least in terms of capacity of the constituent storage devices packed therein. Moreover, the distribution of capacities of storage devices need not be the same, from the first set and the first container to the second set and second container, as clearly shown in FIG. 3. According to one embodiment, although the aggregate capacity of each container may be configured to be at least the aforementioned integer fraction of the aggregate capacity ordered by the customer, one or more of the integer number of containers may contain an aggregate capacity that is greater than the integer fraction of the aggregate capacity ordered by the customer (e.g., greater than 86 TB in the example being developed). For example, had no 3.6 TB storage devices have been produced or available, three 3.7 TB drives may be substituted for the three 3.6 TB drives shown in container 306. This would bring the aggregate capacity of container 306 to 86.3 TB. Moreover, as shown in FIG. 3, the first container 302 need not contain the same number of storage devices of a given capacity as does the second container 306. For example, the first container 302 contains two 4.6 TB storage devices while the second container 306 comprises fully eleven such 4.6 TB storage device.

According to one embodiment, all of the storage devices of the selected first set of storage devices in the first container 302 may be of a same model and all storage devices of the selected second set of storage devices in the second container may also be of a same model. Alternatively, at least some of the selected first set of storage devices in the first container 302 may be of a different model than others of the selected first set of storage devices. Likewise, at least some of the selected second set of storage devices in the second container 306 may be of a different model than others of the selected second set of storage devices. The same can be said across containers 302, 306: one or more of the selected first set of storage devices in the first container 302 may be of a different model than one or more of the selected second set of storage devices in the second container 306. The storage devices may be similar or different in respects other than only model.

According to one embodiment, the manufacturer of the storage devices (or other entity fulfilling the customer's order) may, in turn, have the flexibility of invoicing the customer only for the ordered aggregate capacity (860 TB in this example) or may invoice for the actual aggregate capacity shipped to the customer, which may be more than the ordered aggregate capacity. In this manner, the manufacturer may invoice the customer based on the variable capacities actually shipped, such the customer ultimately pays for an aggregate amount of capacity (e.g., aggregate number of TBs), rather than number of storage device units.

It is understood that, in the example developed with respect to FIG. 3, that eight additional containers of twenty storage devices each would be prepared to fulfill the aggregate capacity of 860 TB ordered by the customer, as suggested in FIG. 5. Such storage device may comprise, for example, HDDs having rotating magnetic media, SSDs, or hybrids thereof.

Figure 4:
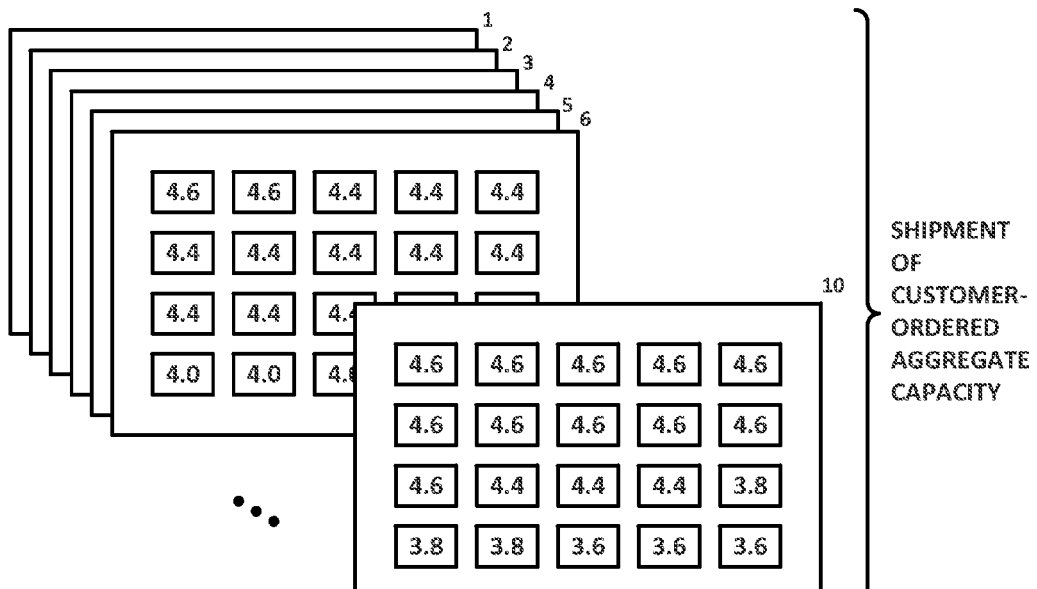
FIG. 4 shows an integer number of containers that together contain storage devices that, in the aggregate, comprise storage that meets or exceeds the customer-ordered aggregate capacity, according to one embodiment.

Having established that each container may be configured to contain storage devices having at least an integer fraction (e.g., 1/N, 2/N, 3/N, where N is the integer number of containers needed to contain the numbers of storage devices making up the aggregate capacity ordered by the customer) of the aggregate capacity ordered by the customer (at least in the case in which the storage devices are to be shipped in same-sized containers), it is still necessary to determine which storage devices, across an available capacity continuum, to select for inclusion in each set and each container. In some situations, non-integer fractions may be used. FIG. 5 is a table showing representative capacity selection possibilities for meeting an exemplary customer-ordered aggregate capacity of 86 TB of data storage capacity using containers configured to accommodate 20 storage devices of varying capacities, according to one embodiment. Indeed, from the available continuum of capacities (in this case, from a great many 4.6 TB storage devices, many 4.4 TB storage devices, somewhat fewer 3.8 and 3.6 TB storage devices and even fewer 4.0 and 4.2 TB storage devices), a plurality of combinations of storage devices of different capacities may be combined in order to achieve sets of 20 drives (in this example) whose aggregate capacity is at least 86 TB. As shown in FIG. 4, each row of this matrix is one possible combination of the available capacities that could be packaged together to meet the 86 TB aggregate capacity per container. For example, the first container 302 of FIG. 3 has a distribution of storage devices corresponding to row S13 of the matrix of FIG. 5. Similarly, the second container 306 of FIG. 3 has a distribution of storage devices corresponding to row S4 of the matrix. This matrix and similar matrices that may be developed enable a manual or automated selection of storage devices of different capacities to meet a predetermined aggregate capacity. Such a matrix, according to one embodiment, enables storage devices of non-standard size (3.0 TB, 4 TB, etc.) to be sold and deployed by the customer, to the customer's benefit as it enjoys greater capacity per drive within a same enclosure. This also benefits the manufacturer, as storage devices having a higher capacity may be sold at a relative premium, as compared to storage devices having been determined to have a relatively smaller capacity.

For customers who can accommodate storage devices having incrementally different capacities, savings may be derived from a lesser need for power, space, heat dissipation and the like. For example, had waterfalling been applied to the storage devices sold to the customer, using 4 TB waterfalled storage devices, more than 10 containers each having aggregate capacity of 80 TB would be necessary. To deploy these extra storage devices, the end user may have to provision for extra racks, extra power handling capacity, greater square footage and a more robust air handling capacity.

Figure 6:
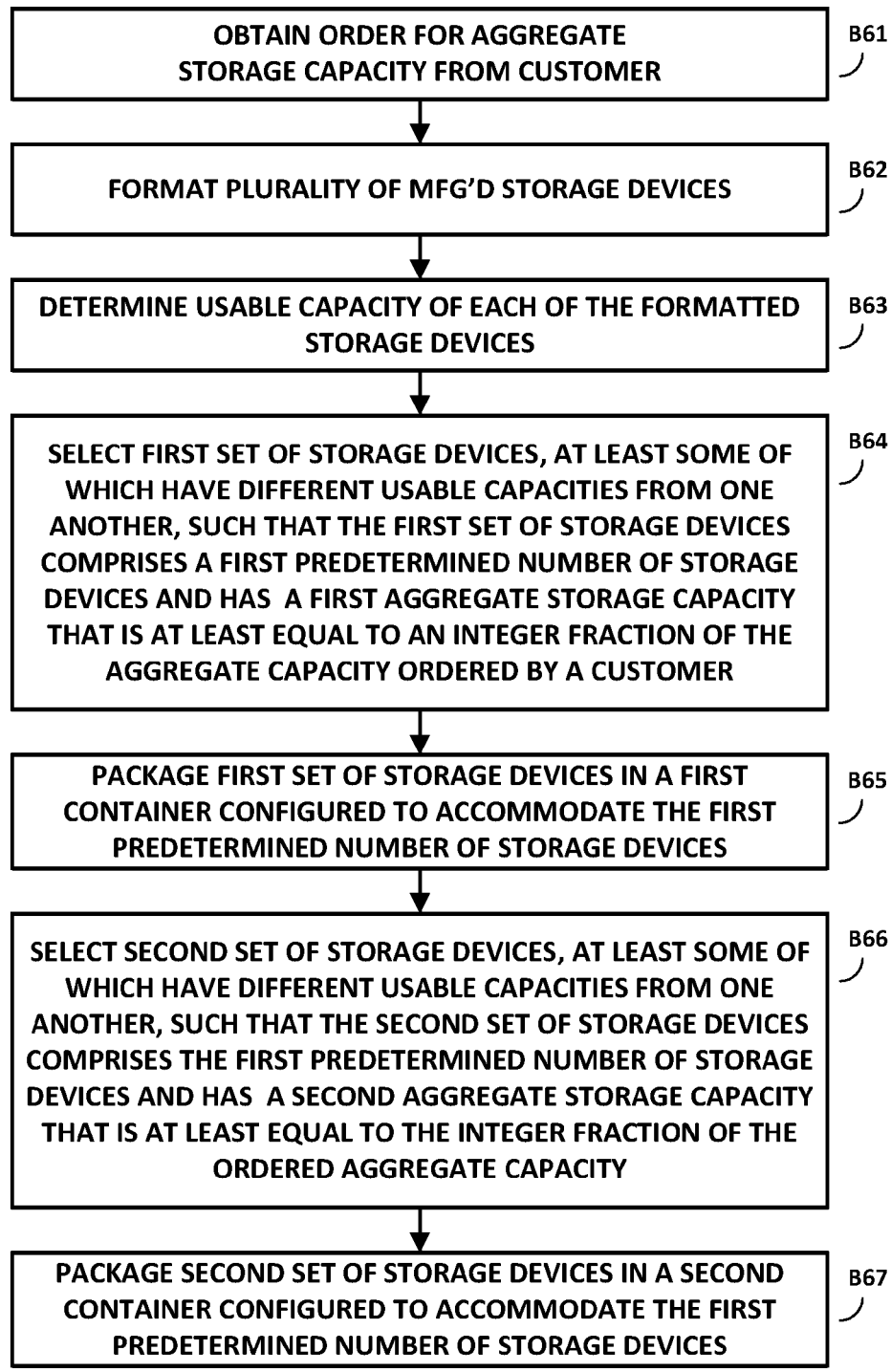
FIG. 6 is a flowchart of an inventory management method for storage devices, according to one embodiment.

FIG. 6 is a flowchart of an inventory management method for storage devices, according to one embodiment. As shown, block B61 calls for obtaining an order for an aggregate storage capacity from a customer. In block B62, a plurality of manufactured storage devices may be formatted and the usable capacity may then be determined, for each of the formatted storage devices as shown at B63. In block B63, one embodiment calls for selecting, from the formatted storage devices, a first set of storage devices, at least some of which have different usable storage capacities from one another, such that the first set of storage devices comprises a first predetermined number of storage devices and has a first aggregate storage capacity that is at least equal to an integer fraction of the aggregate capacity ordered by the customer. This first set of storage devices may then be packaged in a first container configured to accommodate the first predetermined number of storage devices, as shown at B65. In block B66, from remaining ones of the formatted storage devices, a second set of storage devices may be selected, at least some of which have different usable storage capacities from one another, such that the second set of storage devices comprises the first predetermined number of storage devices and has a second aggregate storage capacity that is at least equal to the integer fraction of the ordered aggregate capacity. Then, as shown at B67, the second set of storage devices may be packaged in a second container configured to accommodate the first predetermined number of storage devices.

Figure 7:
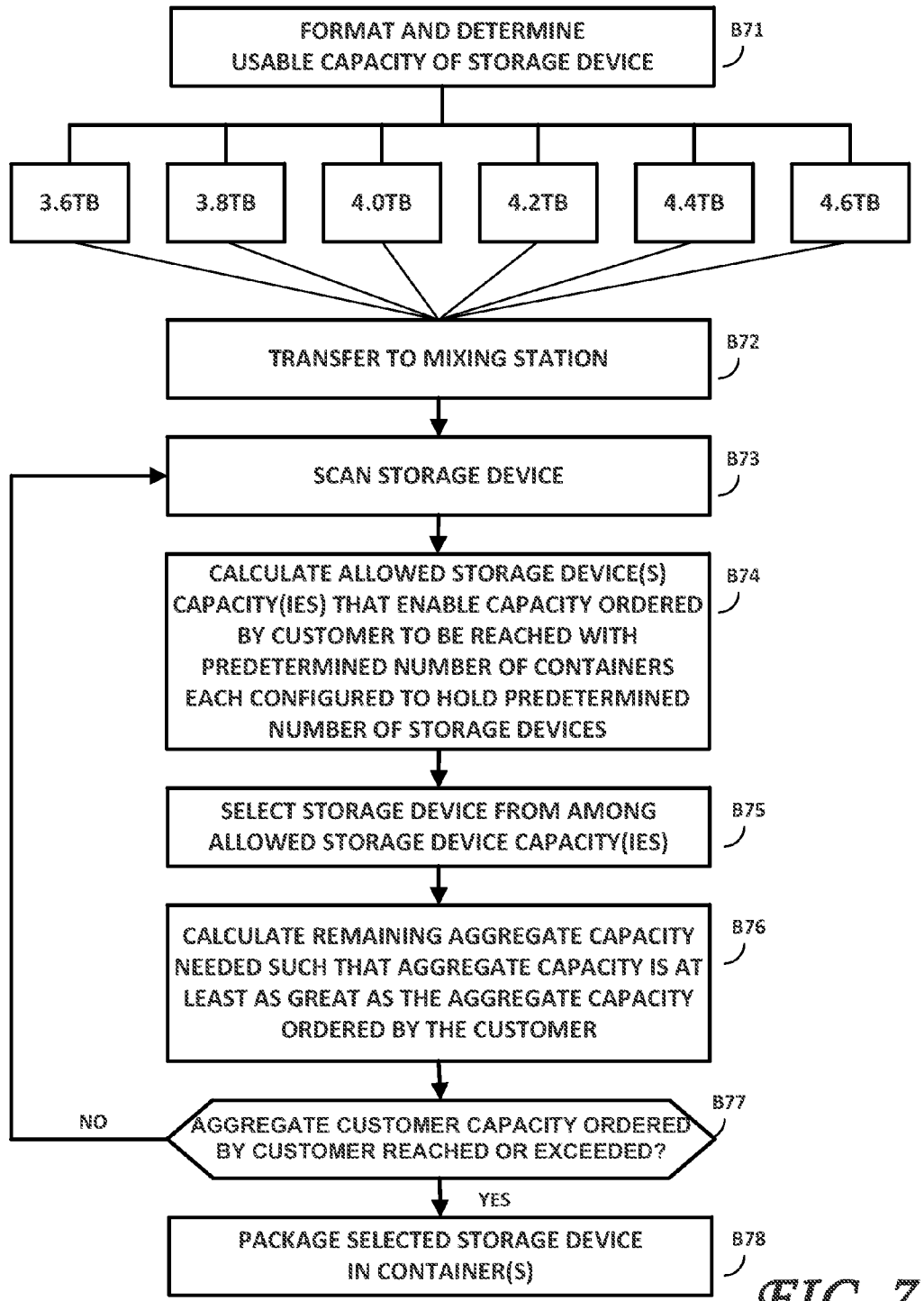
FIG. 7 is a flowchart of one implementation of a computer-implemented method for selecting storage devices for packaging into standard-sized containers to meet or exceed customer-ordered aggregate storage capacity, according to one embodiment.

FIG. 7 is a flowchart of one implementation of a method for selecting storage devices for packing into standard-sized containers to meet or exceed customer-ordered aggregate capacity, according to one embodiment. At the outset, manufactured storage devices may be formatted, whereupon the usable capacity of each formatted storage device may be determined, as shown at B71. In the example of FIG. 7, the usable capacities of the manufactured and formatted drives may be determined to be (in this example) 3.6 TB, 3.8 TB, 4.0 TB, 4.2 TB, 4.4 TB and 4.6 TB, in some frequency distribution. These storage devices may then be transferred to a mixing station at B72, where the selection of the constituent storage devices of each set of storage devices destined for a container may be made. The storage device may then be scanned (presuming that the storage device has previously been labeled or otherwise marked with the previously-determined useable capacity) as shown at B73.

At B74, the allowed storage capacity or capacities that may be selected for inclusion in the current set of storage devices destined to be packaged in a container configured to hold a predetermined (e.g., 20) number of storage devices may be calculated or otherwise determined. For example, at the beginning of this process, it may be calculated that a storage device of any of the 3.6 TB, 3.8 TB, 4.0 TB, 4.2 TB, 4.4 TB and 4.6 TB capacities may be selected, as the container is empty or nearly empty. At B75 a storage device of one of the allowed storage capacities is selected for inclusion in the current set destined for one of the containers. Another determination or calculation may be made at B76, to determine the remaining aggregate capacity needed to meet or exceed the aggregate capacity ordered by the customer. For example, if the ordered capacity is 86 TB and a 4.0 TB storage device was selected in B75, block B76 would determine that the remaining aggregate capacity would be 82 TB. If the aggregate capacity ordered by the customer has not been reached or exceeded by the selected storage device(s) (NO branch of B77), the method may revert back to block B73 to enable to continued selection of the other storage devices to be included in the current or subsequent set. If the aggregate capacity ordered by the customer has indeed been reached or exceeded by the selected storage device(s) (YES branch of B77), the selected storage devices (which may be segregated by set, each set corresponding to one container) may be packaged in one or more containers, as shown at B78.

Significantly, one embodiment enables dynamic capacity improvements through the life of a product/program. One embodiment leverages the tendency of yields to increase, in terms of capacity, throughout the course of a program as the design and related processes mature. With the ability to ship incremental capacities, the manufacturer/vendor and the customer can dynamically realize design improvements without carrying out an entirely new qualification and without having to wait for future products at 18-month (for example) intervals. Embodiments enable the manufacturer to sell storage devices across a greater swath of the production capacity continuum and avoid leaving a leftover pool of less desirable lower capacity drives languishing in inventory or having to be sold at a lower price point.

Figure 8:
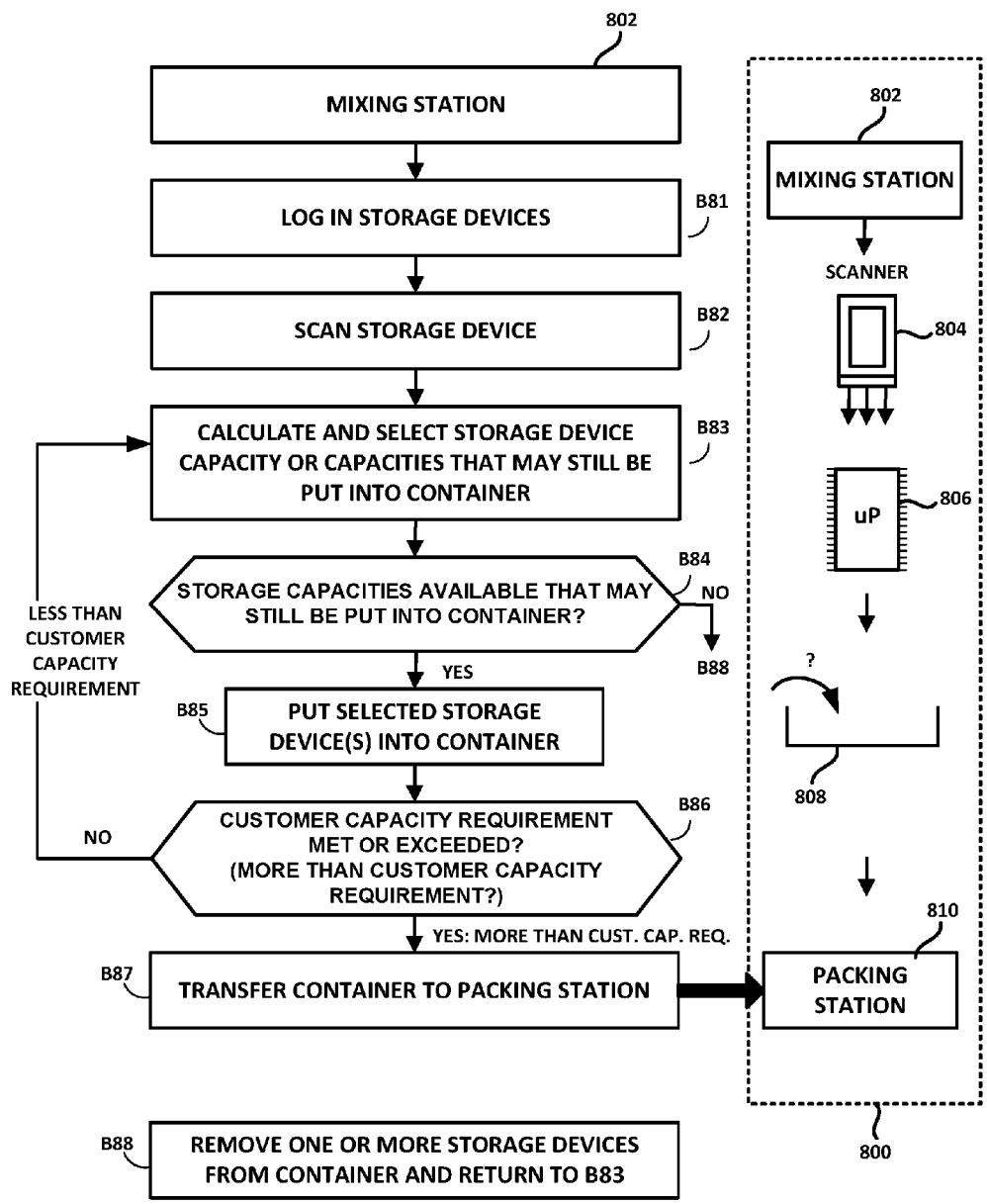
FIG. 8 shows another implementation of a computer-implemented method and system for selecting storage devices for packaging into standard-sized containers to meet or exceed customer-ordered aggregate storage capacity, according to one embodiment.

FIG. 8 shows another implementation of a computer-implemented method and a system 800 for selecting storage devices for packaging into standard-sized containers to meet or exceed customer-ordered aggregate storage capacity, according to one embodiment. Indeed, FIG. 8 assumes that storage devices of various capacities have been transferred to a mixing station 802. According to one embodiment, the mixing station 802 is where storage devices of various capacities are scanned and selected for inclusion in a container 808 prior to being sent to a packing station 810. At B81, the storage devices may be logged in (if not already), to record model number, capacities, interface and other parameters that will enable the selection thereof for inclusion in the container 808. Once the available storage devices are logged in at B81 and thus available for selection for inclusion in container 808, the current storage device being considered for inclusion into the container 808 may be scanned using, for example, optical scanner 804. At B83, the storage capacity or capacities that may still be put into the container 808 may be calculated using a computer or processor 806. This being the first storage device to be selected for inclusion into the container 808, all or most of the capacities scanned at B82 will be available for inclusion into the container 808.

According to one embodiment, in the case of a human operator, a computer system 806 may display, on a suitable monitor coupled thereto, all of the different capacities of storage devices that may still be included into container 808. For example, assume that 4.6 TB, 4.8 TB, 5.0 TB and 5.4 TB storage devices were scanned at B83, as being those storage capacities that are available to satisfy the customer capacity request (which may be, solely for exemplary purposes, say 86 TB). Each of these capacities may be represented by, for example, a graphic such as a "4.8 TB" icon for example. The availability and suitability of each of these capacities may be represented by, for example, a green icon and all those capacities that should not be selected for inclusion into the container 808, by a red icon.

In this scenario, all capacities are still represented by respective green icons, as no storage devices have yet been placed into the container 808. At B84, it may be determined if there are still one or more capacities that may still be put into container. As the container is empty as this stage, the YES branch is followed to B85, in which the selected storage device(s) are put into the container 808. For example, the calculation and selection block B83 may have selected a number of, for example, 4.8 TB storage devices to be put into container 808. Alternatively, a single storage device may have been selected. At B86, it may be determined whether the customer capacity requirement (e.g., 86 TB in this example) has been met and the corresponding storage devices placed into container 808. If not (NO Branch of B86), the method returns to B83, whereupon processor 806 calculates and selects the next storage device(s) to be put into container 808. As earlier, green capacity icons may designate storage capacities that may still be selected and included into the container to meet the customer capacity requirement, while red capacity icons may designate storage capacities that should not be selected and included into the container to meet the customer capacity requirement. This process may be iteratively continued until block B86 determines that the storage devices selected and placed into the container 808 have indeed satisfied (i.e., met or exceeded) the customer's storage capacity requirement. If so (YES branch of B86, the container 808 may be transferred to a packing/shipping station 810 to pack and/or ship the selected storage devices.

If at B84, the processor 806 determines that no available capacities can be put into the container as it is currently filled and still meet the customer capacity requirement (all storage capacity icons, in this case, would show as being red on the display or indicator), block B88 may be carried out to remove one or more storage devices of one or more capacities and to return to B83. This may occur, for example, in the case in which the container 808 currently contains storage devices of various capacities (or the same capacity) that total, for example, 80.4 TB. Since no single storage devices scanned at B82 could fulfill the customer capacity requirement (because it would require an unavailable 5.6 TB drive), one or more of the storage devices in container 808 may be withdrawn from the container 808 and the method may revert back to B83 to calculate what other combinations of available storage capacities would meet or exceed the customer capacity requirement. It is to be understood that colored icons may not be necessary if the picking and placing of the storage devices into the container 808 is carried out by machine (e.g., computer and mechanical actuators).

It is to be understood that embodiments are not limited to storage devices and storage capacities. Indeed, the selection and packaging described and shown therein may be of most any fungible or non-fungible object or data construct. Instead of storage capacity, most any variable characteristic may be used. For example, instead of storage devices, agricultural products and size may be used.

While certain embodiments of the disclosure have been described, these embodiments have been presented by way of example only, and are not intended to limit the scope of the disclosure. Indeed, the novel methods, devices and systems described herein may be embodied in a variety of other forms including, for example, sequences of computer-readable instructions stored on tangible, non-transitory storage media. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

The invention claimed is:

1. An inventory management system, comprising:
    a computer system;
    a scanner in communication with the computer system, the scanner configured to scan a plurality of storage devices to determine one or more storage capacities;
    a monitor in communication with the computer system, the monitor configured to display capacity graphics corresponding to each of the one or more storage capacities, the respective graphics indicating a capacity size and a suitability of inclusion of the capacity size into a container;
    wherein the computer system is configured to:
        receive at least a signal representative of the storage capacity of each of the plurality of storage devices scanned by the scanner;
        determine, based at least in part on the received signal, storage capacities that will at least partially meet a predetermined aggregate storage capacity;
        determine a storage capacity of a first storage device selected for inclusion in the container; and
        update the capacity graphics on the monitor to indicate the suitability of the one or more storage capacities to at least partially meet the predetermined aggregate storage capacity after accounting for the storage capacity of the first storage device; and
    a mechanical actuator in communication with the computer system, the mechanical actuator configured to pick and place the first storage device into the container.

2. The system of claim 1, wherein the computer system is further configured to indicate, on the monitor, those storage devices from among the plurality of storage devices that are not suitable for inclusion in the container.

3. The system of claim 1, wherein at least some of the plurality of storage devices are of a different model than at least some others of the plurality of storage devices.

4. The system of claim 1, wherein at least some of the plurality of storage devices comprise at least one of rotating magnetic media, solid state memory and both rotating media and solid-state memory.

5. The system of claim 1, wherein the computer system is further configured to calculate a remaining storage capacity that is still needed to at least meet the predetermined aggregate storage capacity.

6. The system of claim 1, wherein the one or more storage capacities comprise standard and non-standard capacities.

7. The system of claim 1, the computer system further configured to repeatedly update the capacity graphics on the monitor to indicate the suitability of the capacity size of storage devices as additional storage devices are selected for inclusion in the container.

8. The system of claim 7, wherein the first storage device and the additional storage devices comprise a plurality of different storage capacities.

9. The system of claim 1, wherein the computer system is further configured to select the first storage device for inclusion in the container.

10. An inventory management method for storage devices, comprising:
    determining, using a scanner, one or more storage capacities corresponding to a plurality of storage devices;
    displaying, on a monitor, capacity graphics corresponding to each of the one or more storage capacities, the respective graphics indicating a capacity size and a suitability of inclusion of the capacity size into a container;
    determining, by a computer system in communication with the monitor and scanner, storage capacities of the plurality of storage devices that will at least partially meet a predetermined aggregate storage capacity corresponding to a customer order associated with the container;
    determining, by the computer system, a storage capacity of a first storage device selected for inclusion in the container;
    placing, with a mechanical actuator in communication with the computer system, the first storage device into the container; and
    updating the capacity graphics on the monitor to indicate the suitability of the one or more storage capacities to at least partially meet the predetermined aggregate storage capacity after accounting for the storage capacity of the first storage device.

11. The inventory management method of claim 10, further comprising invoicing a customer for the predetermined aggregate storage capacity.

12. The inventory management method of claim 10, further comprising invoicing a customer for the aggregate storage capacity actually shipped.

13. The inventory management method of claim 10, further comprising repeatedly placing additional storage devices into the container until the predetermined aggregate storage capacity is met or exceeded.

14. The inventory management method of claim 13, wherein the first storage device and the additional storage devices comprise a plurality of different storage capacities.

15. The inventory management method of claim 10, wherein at least some of the plurality of storage devices comprise one of rotating magnetic media, solid state media and both rotating media and solid-state media.

16. The inventory management method of claim 10, further comprising visually indicating on the monitor those storage devices from among the plurality of storage devices that are not suitable for inclusion in the container.

17. The inventory management method of claim 10, further comprising calculating a remaining storage capacity that is still needed to at least meet the predetermined aggregate storage capacity.

18. The inventory management method of claim 10, wherein the one or more storage capacities comprises standard and non-standard capacities.

19. The inventory management method of claim 10, further comprising selecting the first storage device for inclusion in the container.

* * * * *